April 21, 1959 — G. V. McKIM — 2,883,025
WHEEL LOCKING DEVICES FOR FOUR WHEEL DRIVE VEHICLES
Filed Nov. 30, 1956
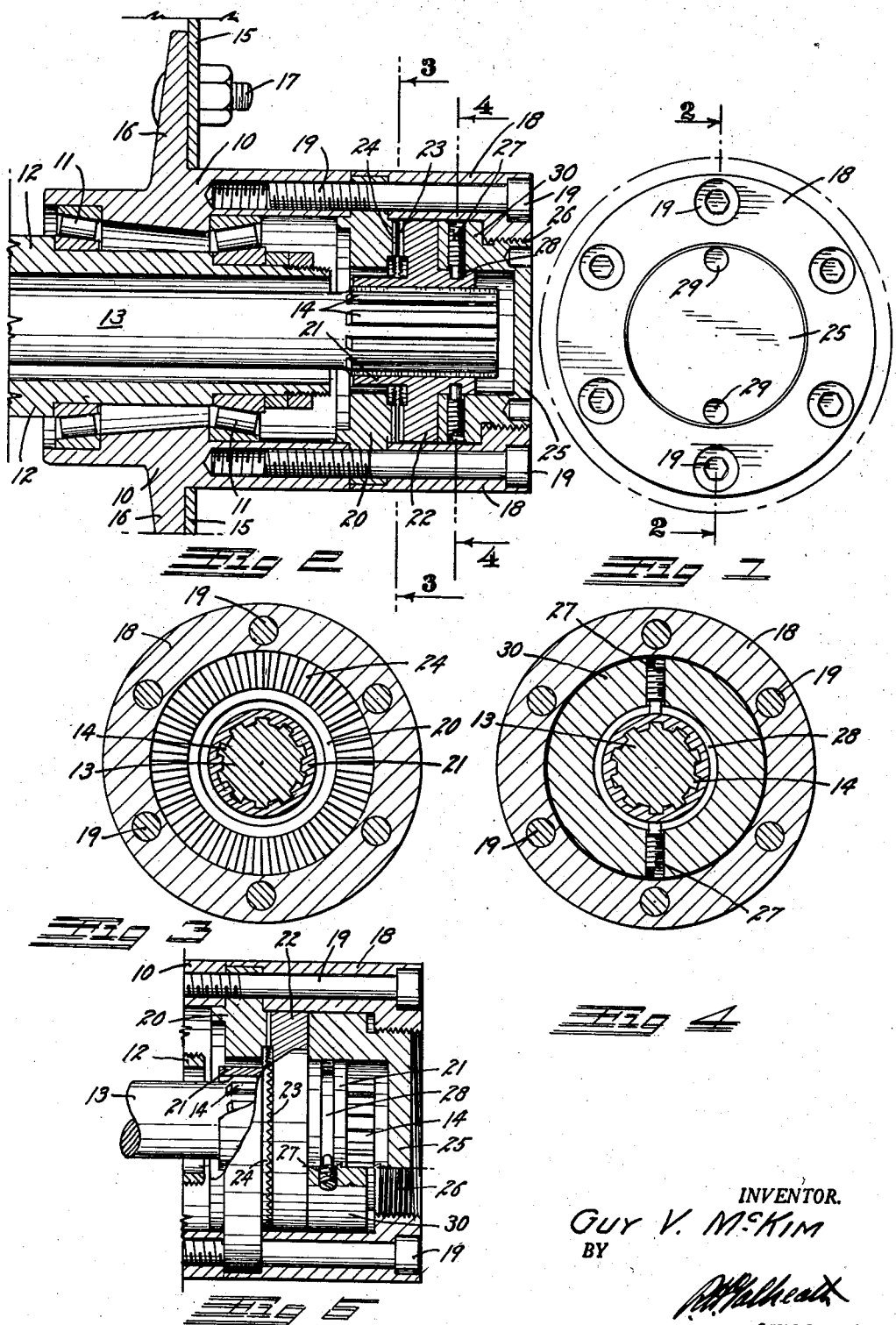
INVENTOR.
GUY V. McKIM
BY
ATTORNEY

2,883,025
WHEEL LOCKING DEVICES FOR FOUR WHEEL DRIVE VEHICLES

Guy V. McKim, Denver, Colo.

Application November 30, 1956, Serial No. 625,412

1 Claim. (Cl. 192—67)

This invention relates to a wheel clutch mechanism more particularly designed for releasing the front wheels of a four-wheel drive vehicle so that they will "free wheel" when desired. The employment of all four wheels of a vehicle as drive wheels is highly desirable when the vehicle is subjected to extreme traction requirements. However, when the vehicle is being used for lighter driving purposes the four wheel drive is unnecessary and results in wasted power and cumbersome and unhandy driving and handling of the vehicle.

The principal object of the invention is to provide a simple, highly efficient clutch mechanism which will enable the driver to quickly and easily disconnect the front wheels of the vehicle from the power-drive mechanism so that they will function simply as guide wheels similar to the usual front wheels of an automotive vehicle.

Another object of the invention is to so construct the wheel clutch that it can be quickly and easily connected or disconnected regardless of the relative positions between the drive mechanism and wheel.

A further object of the invention is to provide a wheel structure which will have a minimum of operating parts and which will be light in weight and exceedingly wearable.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a face view of the improved wheel clutch;

Fig. 2 is a longitudinal section therethrough taken on the line 2—2, Fig. 1, in the disconnected or "free wheeling" position;

Figs. 3 and 4 are cross-sections taken on the lines 3—3 and 4—4, respectively, Fig. 2; and Fig. 5 is a fragmentary, longitudinal section illustrating the improved wheel clutch in the engaged or "drive" position.

In the drawing a conventional wheel hub is indicated at 10 rotatably mounted on the usual roller bearings 11 upon a vehicle axle housing 12. A power transmitting axle is illustrated at 13 provided with the usual power delivering splines 14. The above described structure is conventional in the usual four-wheel drive vehicle and is designed to receive a wheel disc 15 which is secured to a wheel flange 16 by means of wheel lugs 17. In the usual vehicle, a power transmission cap is bolted to the hub 10 by means of hub cap screws 19 and it engages the splines 14 for transmitting power from the axle 13 to the wheel 15.

In applying this invention, the usual power transmitting cap is removed and a cylindrical clutch housing 18 is secured to the hub 10 by means of the hub cap screws 19. An annular clutch plate 20 is clamped between the housing 18 and the hub 10. The screws 19 pass through the clutch plate 20 to rigidly secure it to the hub 10 of the wheel.

A floating spline sleeve 21 surrounds the splined portion of the axle 13 and slidably interfits with the splines 14 thereon. A floating clutch disc 22 is mounted on, or formed on, the spline sleeve 21 and concentrically surrounds the latter within the housing 18 in parallel relation to the clutch plate 20. The clutch disc 22 is provided with an annular band of radially extending V-shaped clutch teeth 23 and the clutch plate 20 is provided with a similar annular band of radially extending V-shaped clutch teeth 24. The two bands of clutch teeth 23 and 24 are of similar pitch so that when the clutch disc 22 is moved toward the clutch plate 20, the teeth of the band 23 will intermesh with the teeth of the band 24.

Axial movement of the clutch disc is accomplished by rotation of a cup-shaped hub nut 25 which is threaded in the outer face of the housing 18 as indicated at 26. The hub nut 25 is provided with an enlarged shoulder portion 30 which limits the outward movement of the nut and which rotatably engages the outer face of the clutch disc 22. The shoulder portion 30 of the nut 25 rotatably surrounds the spline sleeve 21 and is provided with set screws 27, the inner extremities of which engage in a circumferential-receiving groove 28 formed in the sleeve 21. The screws 27 prevent relative axial movement between the clutch disc 22 and the hub nut 25 and yet allow free, relative rotative movement therebetween. The nut 25 is provided with any suitable wrench engaging means, for instance, it could be provided with a pair of oppositely positioned spanner wrench sockets 29.

In Fig. 2, the improved wheel clutch is illustrated in the released or "free wheeling" position. The wheel 15 may rotate freely on its bearings 11 since there is no interengagement between the clutch disc 22 and the clutch plate 20. Should it be desired to connect the wheel to the axle 13 for four-wheel drive purposes, the nut 25 is rotated by means of a suitable spanner wrench so as to thread it inwardly into the housing 18 until the clutch disc is firmly clamped against the clutch plate 20 with the teeth of the bands 23 and 24 in complete circumferential engagement.

It can now be seen that power delivered by the axle 13 will be transmitted through the splines 14 to the clutch disc 22 and thence, through the bands of teeth 23 and 24, to the clutch plate 20. Since the clutch plate is fixedly mounted on the hub 10 by means of the cap screws 19, the power will be transmitted to the wheel 15.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A front wheel clutch mechanism for four wheel drive vehicles of the type having a wheel hub rotatably mounted on an axle housing, with a splined power-transmitting axle extending from said housing within said hub, comprising: an annular clutch plate having a concentric axle opening; a cylindrical clutch housing conforming substantially in diameter to said hub; cap screws securing said housing to said hub, with said clutch plate interposed therebetween in rigid, clamped relation; a floating spline sleeve surrounding the splined portion of said axle; a clutch disc formed on and surrounding said sleeve within said housing in parallel relation to said clutch plate; a first band of radially extending tapered clutch teeth formed on the outer face of said clutch plate; a second band of radially extending clutch teeth formed on the inner face of said clutch disc, said two bands lying in planes at right angles to the axis of said axle and being of intermeshing pitch; a cup-shaped hub nut mounted in the outer extremity of said housing, said hub nut having external threads meshing with internal threads in said housing, said housing having an inwardly extending shoulder portion which acts to limit the outward movement of said nut, said nut overlapping and surrounding said spline sleeve; a circumferentially extending groove formed in the overlapped portion of said sleeve; and a radially extending set screw in said nut engaging in said groove to allow relative rotation between said clutch disc and said nut, and to prevent separation thereof.

References Cited in the file of this patent

UNITED STATES PATENTS

| | | |
|---|---|---|
| 2,644,562 | Pettus | July 7, 1953 |
| 2,684,140 | Warn | July 20, 1954 |
| 2,788,103 | Requa | Apr. 9, 1957 |

FOREIGN PATENTS

| | | |
|---|---|---|
| 913,969 | Germany | June 28, 1954 |